(12) United States Patent
Schulz et al.

(10) Patent No.: US 6,572,836 B1
(45) Date of Patent: Jun. 3, 2003

(54) METHOD FOR PRODUCING GASEOUS HYDROGEN BY CHEMICAL REACTION OF METALS OR METAL HYDRIDES SUBJECTED TO INTENSE MECHANICAL DEFORMATIONS

(75) Inventors: Robert Schulz, Quebec (CA); Jacques Huot, Quebec (CA); Guoxian Liang, Quebec (CA); Sabin Boily, Quebec (CA)

(73) Assignee: Hydro-Quebec, Montreal (CA)

(*) Notice: Subject to any disclaimer, the term of this patent is extended or adjusted under 35 U.S.C. 154(b) by 0 days.

(21) Appl. No.: 09/546,712

(22) Filed: Apr. 10, 2000

(51) Int. Cl.$^7$ .............................. C01B 3/02; C01B 3/04; C01B 3/08
(52) U.S. Cl. ............... 423/648.1; 423/657; 423/658.2
(58) Field of Search ......................... 423/657, 658.2, 423/648.1

(56) References Cited

U.S. PATENT DOCUMENTS

| | | | |
|---|---|---|---|
| 3,787,186 A | 1/1974 | Geres | 23/282 |
| 5,372,617 A | 12/1994 | Kerrebrock et al. | 48/61 |
| 5,593,640 A | 1/1997 | Long et al. | 422/111 |
| 5,702,491 A | 12/1997 | Long et al. | 48/197 R |
| 5,833,934 A | 11/1998 | Adlhart et al. | 422/239 |
| 5,882,623 A | 3/1999 | Zaluska et al. | 423/648.1 |
| 6,342,198 B1 * | 1/2002 | Zaluska et al. | 423/658.2 |

FOREIGN PATENT DOCUMENTS

| | | |
|---|---|---|
| GB | 2 165 532 | 4/1986 |
| WO | 99/20422 | 4/1999 |

OTHER PUBLICATIONS

Hackh's *Chemical Dictionary* (Fourth Edition (1969)), McGraw–Hill Book Company, p. 573 (no month).*
Breault et al., "Hydrogen transmission/stronge with a chemical hydride/organic slurry", U.S DOE Hydrogen Program Review, 1999. (no month).

* cited by examiner

*Primary Examiner*—Wayne A. Langel
(74) *Attorney, Agent, or Firm*—Foley & Lardner

(57) ABSTRACT

An improved method is disclosed for producing gaseous hydrogen by subjecting a metal or a metal hydride to a chemical reaction. In this method, the metal or metal hydride subjected to the chemical reaction is nanocrystalline. Indeed, it has been found that when, instead of using conventional metal hydrides (Mg-based or others), use is made of a metal or metal hydride that is or has been subjected to intensive mechanical deformations, such as a metastable nanocrystalline metal hydride, then the chemical reaction, especially hydrolysis, will take place much more readily, at a much higher rate and, most of the time, up to completion.

15 Claims, 7 Drawing Sheets

METHOD FOR PRODUCING GASEOUS HYDROGEN BY CHEMICAL REACTION OF METALS OR METAL HYDRIDES SUBJECTED TO INTENSE MECHANICAL DEFORMATIONS

BACKGROUND OF THE INVENTION a) Field of the Invention

The present invention relates to a method for producing gaseous hydrogen by chemical reaction of a metal or a metal hydride that is or has been subjected to intense mechanical deformations.

The invention also relates to an apparatus for producing gaseous hydrogen, which is specially desired to carry out the above method.

The invention further relates to a method for producing gaseous hydrogen by chemical reaction of a nanocrystalline metal hydride.

In the following description and appended claims, the term "nanocrystalline" is used to identify products whose particles have nanocrystalline grains with an average size of 3 to 300 nm. The term <<chemical hydride>> as used hereinafter means a metal hydride that can be used in a chemical reaction to produce hydrogen or other secondary products.

b) Brief Description of the Prior Art

It is known that $CaH_2$, NaH and LiH can be used as chemical reactants together with water to produce hydroxides and hydrogen by a reaction that is called <<hydrolysis>>:

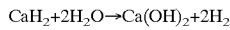   1)

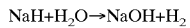   2)

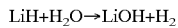   3)

It is also known that hydrogen can be released by reacting pure metals with water, as in the following reaction:

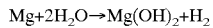   4)

The above reactions and industrial processes using them to produce gaseous hydrogen have been known for a long time.

For instance, U.S. Pat. No. 3,787,186 (1974) entitled "calcium hydride gas generator>> discloses a gas generator in which $CaH_2$ is reacted with water to generate hydrogen gas to activate a gas operated pump.

U.S. Pat. No. 5,372,617 (1994) entitled <<Hydrogen generation by hydrolysis of hydrides for undersea vehicle fuel cell energy systems>> discloses a hydrogen generator for hydrolyzing hydrides to provide hydrogen on demand to a fuel cell, the water for the reaction being provided as the by-product of the fuel cell.

U.S. Pat. No. 5,833,934 (1998) entitled <<Demand responsive hydrogen generator based on hydride water reaction>> discloses a novel generator configuration for reacting an alkali or alkali-earth metal hydride with water to generate hydrogen.

U.S. Pat. No. 5,593,640 and U.S. Pat. No. 5,702,491 (1997) entitled <<Portable hydrogen generator>> disclose a hydrogen generator and a method for generating hydrogen by hydrolysis. This method requires that the chemical hydride be heated prior to hydrolyzing.

In two papers entitled a Hydrogen transmission/storage with a metal hydride/organic slurry" and a <<Hydrogen for a PEM fuel cell vehicle using a chemical-hydride slurry>> published in the proceedings of the 1999 US DOE Hydrogen Program Review, Ronald W. Breault et al. disclose a process wherein a chemical hydride is mixed with an organic compound such as a mineral oil in a 50/50 mixture to stabilize the product and the so prepared chemical hydride/organic slurry is reacted with water to release hydrogen.

The main problems with these existing processes to produce hydrogen, are that the hydrolysis reaction is often incomplete or proceeds either at an insufficient rate or, in other cases, at a too high or uncontrollable rate (explosive reaction like in the case of LiH). With conventional metal hydrides, the hydroxide film which is formed on the surface of the material during hydrolysis may passivate this surface and stop the reaction. The following are examples of problems described by some authors:

<<sodium hydride has a base-limited hydrolysis reaction. When the pH of the system reaches approximately 13.6 the hydrolysis reaction stalls>>;

<<the calcium hydride was observed to be considerably slower than the sodium hydride and the lithium hydride>>;

<<one of the essential considerations of the metal hydride is its hydrogen generation efficiency, which includes reaction chemistry between metal hydride and water to complete hydrolysis reactions in a safe and controlled manner>>;

<<calcium hydride ($CaH_2$) reacts with water to form the hydroxide $Ca(OH)_2$ at room temperature. Any hydroxide formed below 400° C. decomposes endothermically above 580° C., liberating water. If there is any unreacted hydride present when the water is released, it will react instantaneously producing $H_2$ and CaO. The hydride itself decomposes thermally only above 600° C.>> (this means that if the temperature increases too much due to the exothermic reaction between $CaH_2$ and water, a self-sustain or explosive reaction can occur); and, finally, <<regeneration of the end products is potentially problematic>>.

In all the above mentioned patents and articles, $MgH_2$ has never been used in practice in spite of its low cost, probably because the reaction of $MgH_2$ with $H_2O$ proceeds at a rate too low for practical applications and is incomplete because of the formation of passivating $Mg(OH)_2$ layers.

On the other hand, U.S. Pat. No. 5,882,623 (1999) naming one of the present coinventors, Mr. SCHULZ, also as coinventor, discloses inter alia a method for chemically inducing hydrogen desorption from a metal hydride. In accordance with this method, a powder of a Mg-based hydride is mixed with a small amount of a powder capable of reacting with water such as $LiAlH_4$ (see example 2). Addition of an appropriate amount of water causes a rapid and exothermic reaction ($LiAlH_4+4H_2O \rightarrow Li(OH)+Al(OH)_3+4H_2$) which releases a large amount of heat and causes desorption of hydrogen from the Mg-based hydride.

SUMMARY OF THE INVENTION

The object of the present invention is to provide a method for producing gaseous hydrogen by chemical reaction of a metal or a metal hydride, which method is an improvement to the technologies disclosed in the above mentioned patent U.S. Pat. No. 5,882,623 and solves the above listed problems.

The present invention is based on a discovery made by the present inventors that when instead of using conventional metal hydrides (Mg-based or others), use is made of a metal or metal hydride that is or has been subjected to intensive mechanical deformations, such as a metastable nanocrystalline metal hydride, the chemical reaction (especially hydrolysis) will then take place much more readily, at a much higher rate and, most of the time, up to completion (100% conversion).

This is a very important discovery for practical applications. Indeed, because of the particular microstructure and the very large number of grain boundaries and crystalline defects, nanocrystalline metal or metal hydrides especially those made by high energy ball milling, are much more reactive than conventional metal hydride. Thus, the chemical reactions (hydrolysis is a particular case) take place much more rapidly and up to completion.

Thus, the present invention provides an improved method for producing gaseous hydrogen by subjecting a metal or a metal hydride to a chemical reaction, wherein the metal or metal hydride subjected to the chemical reaction is nanocrystalline.

The invention also provides an improved method for producing gaseous hydrogen by subjecting a metal or metal hydride to a chemical reaction, wherein the metal or metal hydride is subjected before or during the reaction to intense mechanical deformations to activate said reaction.

The invention further provides an apparatus for producing gaseous hydrogen, which comprises a reactor in which a metal or metal hydride is subjected to a chemical reaction. In accordance with the invention, this apparatus also comprises means within the reactor for subjecting the metal or metal hydride to intense mechanical deformations in order to activate the chemical reaction.

The invention and its advantages will be better understood upon reading the following non-restrictive description and examples.

DETAILED DESCRIPTION OF THE INVENTION

Figure 1A:
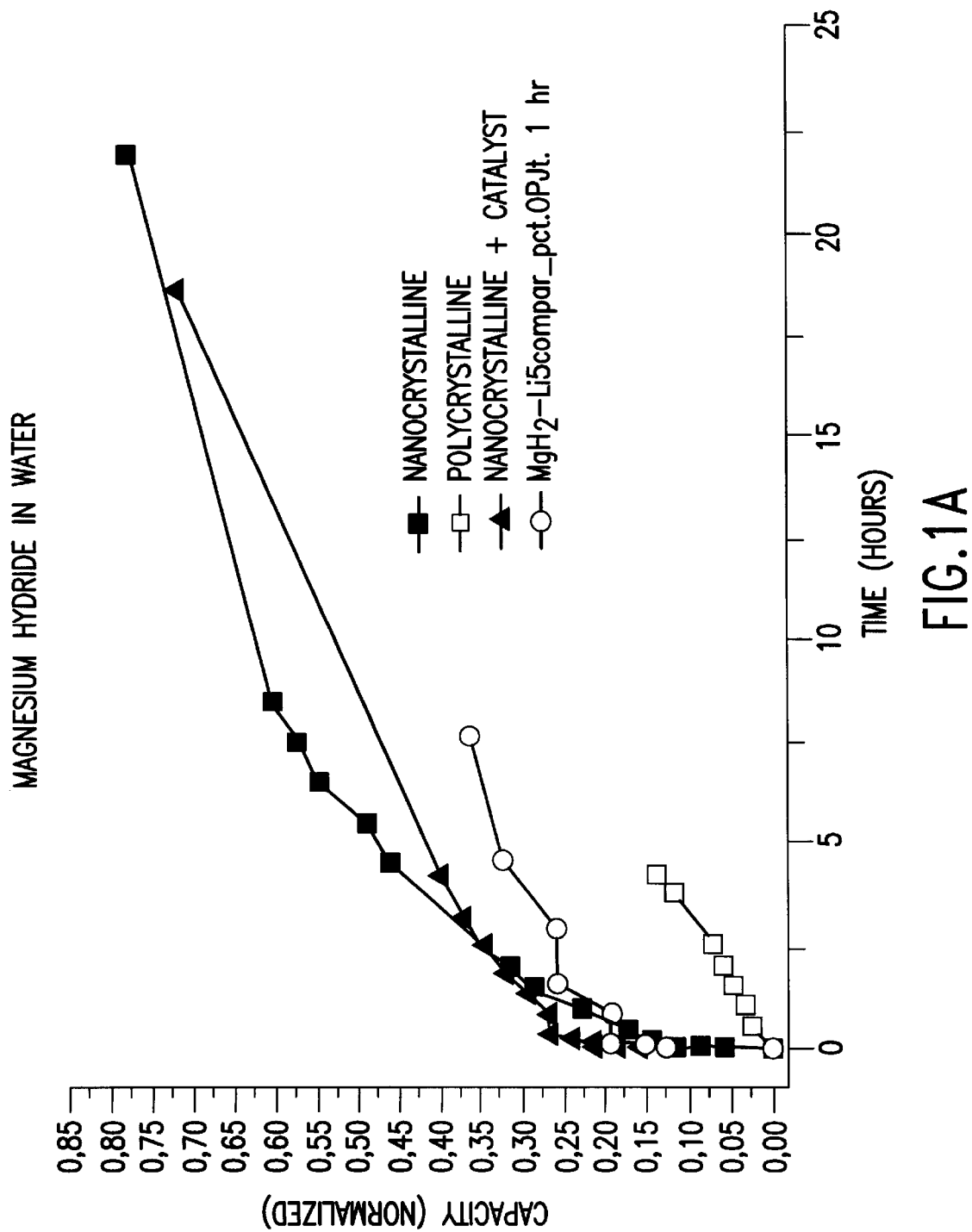
FIGS. 1a, 1b and 1c are curves giving, at different scales, the percentages of hydrogen released by hydrolysis of different types of polycrystalline and nanocrystalline magnesium hydrides as a function of time.
Figure 1B:
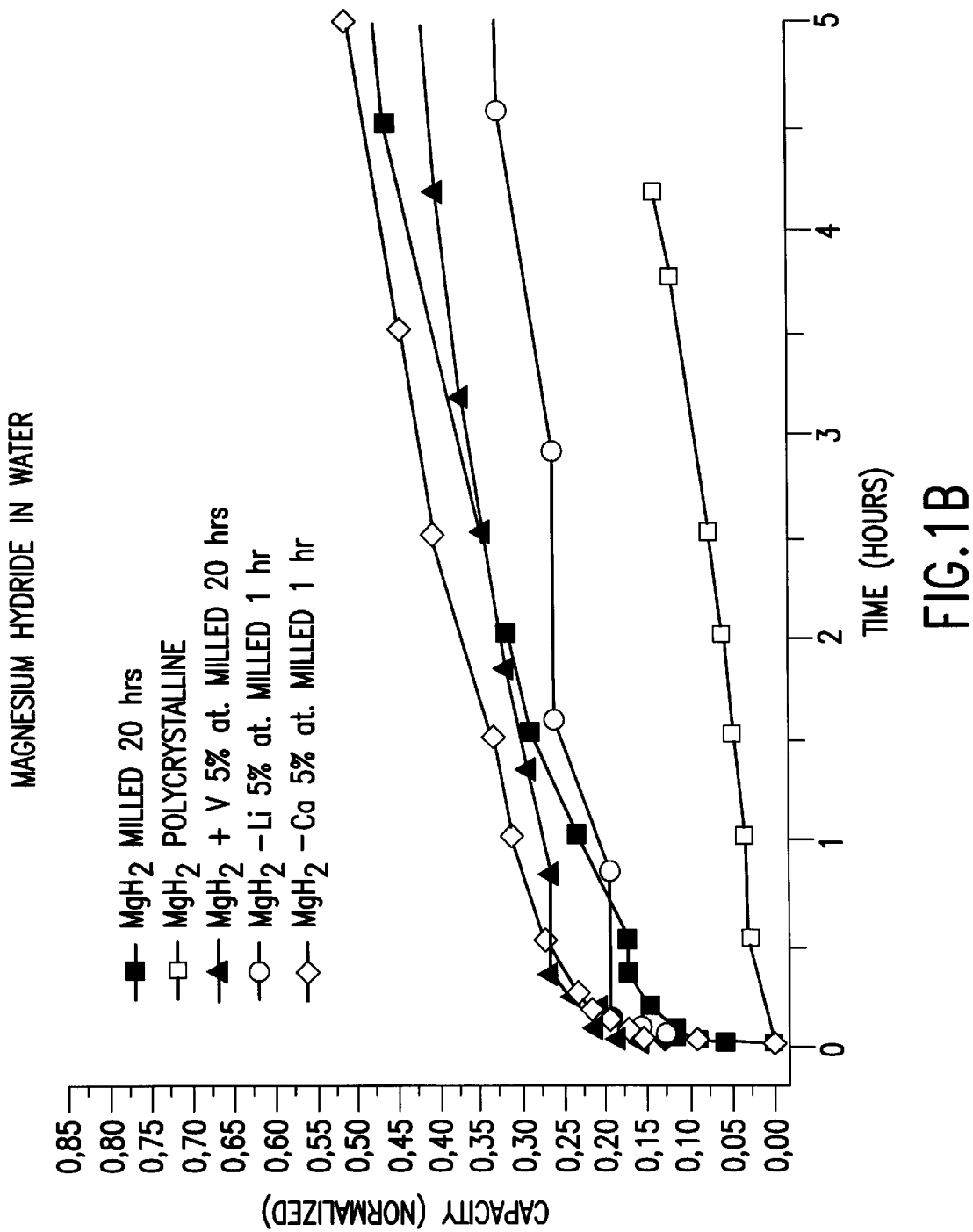

As aforesaid, the method according to the invention distinguishes over the prior art in that it makes use, as a starting material, a metal or metal hydride that is or has already been subjected to intensive mechanical deformations. Examples of metal hydrides that have already been subjected to intensive mechanical deformations are the nanocrystalline metal hydrides prepared by mechanosynthesis such as high energy ball milling, that are as is described by way of examples in the following patents:

U.S. Pat. No. 5,964,965 <<Nanocrystalline Mg-based materials and use thereof for the transportation and storage of hydrogen>>;

U.S. Pat. No. 5,763,363 <<Nanocrystalline Ni-based alloys and use thereof for the transportation and storage of hydrogen>>;

U.S. Pat. No. 5,906,792 <<Nanocrystalline composite for hydrogen storage>>; and

CA-A-2,217,095 <<Nanocomposite with activated interfaces prepared by mechanical grinding of Mg-based hydrides>>.

A first advantage of using nanocrystalline metal hydrides is that such hydrides have a high specific surface. When considering chemical reaction kinetics between two reactants (metal hydrides and water, for example) the contact surface between the two chemicals is of great importance. The higher the specific surface of the hydride, the higher the rate of the reaction will be. Usually, conventional metal hydrides have specific surface areas much lower than 1 $m^2/g$. Ball milled or mechanically alloyed metal hydrides have typically one order of magnitude higher surface areas ranging from 1 to 10 $m^2/g$ and therefore they react much more readily with water.

In U.S. Pat. No. 5,872,074 entitled <<Leached nanocrystalline materials process for the manufacture of the same and use thereof in the energetic field>> a method is disclosed to further increase the specific surface area of nanocrystalline materials to values as high as 100 $m^2/g$. All of these nanoporous nanocrystalline metal hydrides can react with water at an extremely high speed.

Another advantage of using nanocrystalline metal hydrides is that they have numerous structural defects (grain boundaries, dislocations, surface defects etc.) which, usually, give rise to defective metal hydroxide coatings when reacting with water. This reacted layer is non-passivating and, therefore, the reaction can proceed up to completion.

A further advantage of using nanocrystalline metal hydrides is that, thanks to their method of manufacture, one can easily adjust their chemical composition. It is well known that to improve a chemical reaction, it is often desirable to adjust the chemical compositions of the reactants. In the present case, this can easily be done by mechanical alloying or high energy ball milling. High energy ball milling can produce a wide range of metastable alloys (amorphous alloys, supersaturated solid solutions etc.) with compositions which cannot be achieved by conventional processing routes. It is also possible to produce composites by ball milling. For instance, it is possible to mill $MgH_2$ and Li or $MgH_2$ and Ca and produce $MgH_2/LiHx$ or $MgH_2/CaHx$ nanocomposites. By reaction with water, the Li or Ca components will react first liberating heat which will be transferred to $MgH_2$ which will then decompose into Mg and $H_2$ by endothermic reaction.

Thus, in accordance with the invention, use can be made of any <<conventional nanocrystalline>> metal hydride that has been prepared by mechanosynthesis of the corresponding metal and metal hydride in polycrystalline form. Such metal hydride may include elements selected from Mg, Li, Be, Ca, Na, K, Al, Ti, V, Cr, Mn, Co, Ni, Cu, Fe, Zn, B, Zr, Y, Nb, Mo, In, Sn, Si, H, C, O, F, P, S, La, Pd, Pt, Mm and Re where Mm is mish-metal and Re is a rare earth metal. Preferably, use should be made of nanocrystalline $MgH_2$.

One potential method to produce the nano-chemical hydride is by reactive milling in a hydrogen atmosphere whereby the components of the hydride are milled under appropriate conditions of temperature and pressure for a sufficient amount of time to produce the hydride.

Use can also be made of nanocrystalline metal hydrides containing two or more of the above mentioned elements. Preferably, such an alloy or <<composite>> metal hydride should be a Mg-based metal hydride where the other element is preferably Li, Ca or Na.

Nanocrystalline or nanostructured chemical hydrides can also be prepared by other methods than mechanosynthesis or ball milling such as: gas phase condensation, laser and plasma processing, sol-gel, chemical routes, spray techniques etc.

In use, the nanocrystalline metal hydride may be in the form of a pellet incorporating or not a binder. As an example of such a binder, reference can be made to Mg.

In accordance with the invention, the chemical reaction is preferably a hydrolysis reaction eventhough reactions with other compound such as, for example HCl, could also be used.

The previously mentioned patents and articles dealing with the production of hydrogen by hydrolysis reaction using a hydride as starting material have only identified $CaH_2$, LiH and some alkali-earth metal hydrides such as $LiAlH_2$ as good candidates amongst a rather limited number of potential chemical hydrides. This is not surprising since these materials are known to react violently with water. The prior art has never proposed to use $MgH_2$ in spite of its low cost, probably because it is known that $MgH_2$ does not react as readily with water.

The hydrolysis reactions of $MgH_2$ and $CaH_2$ are as follows $$MgH_2 + 2H_2O \rightarrow Mg(OH)_2 + 2H_2 \qquad a)$$

$$CaH_2 + 2H_2O \rightarrow Ca(OH)_2 + 2H_2 \qquad b)$$

Eventhough pure Mg can react with water to produce hydrogen according to the following reaction:

$$Mg + 2H_2O \rightarrow Mg(OH)_2 + H_2$$

it is much more interesting to use $MgH_2$ as a reactant because if the hydrogen that is produced is to be used in a fuel cell, the product of the electrochemical reaction:

$$2H_2 + O_2 \rightarrow 2H_2O$$

will be in sufficient quantity to <<feed>> reaction a) hereinabove. So, there will be no need to carry additional water.

The effective initial and final storage capacities of storage tanks based on the above reactions are:

initial: $2H_2/MgH_2=15.3\%$ final: $2H_2/Mg(OH)_2=6.9$     a)

initial: $2H_2/CaH_2=9.6\%$ final: $2H_2/Ca(OH)_2=5.4\%$     b)

As can be noticed, the initial and final storage capacities obtained in the case of reaction a) are above the target of 6 wt % proposed by automotive industry for on board hydrogen storage (5 kg $H_2$ total).

Moreover, it is important to mention that unlike $CaH_2$, $MgH_2$ and especially ball-milled nanocrystalline $MgH_2$ (see the above mentioned U.S. Pat. No. 5,882,623), decomposes thermally at a lower temperature (200–290° C.) than its hydroxide (350° C.). Therefore, it is possible to control the production of hydrogen by thermal decomposition and hydrolysis by adjusting the injection of water in such a way that the temperature of the reactor is kept around 300° C. and the heat released by the Mg hydroxide formation ($MgH_2 + 2H_2O \rightarrow Mg(OH)_2 + 2H_2$, $\Delta H > -300$ kJ/mol) is balanced by the heat absorbed by endothermic thermal desorption ($MgH_2 \rightarrow Mg + H_2$, $\Delta H = +74.5$ kJ/mol).

To sum up, the following reactions and information summarize the main differences between the $MgH_2$ and $CaH_2$ systems:

| | | | |
|---|---|---|---|
| $MgH_2 + 2H_2O$ | $\Rightarrow$ | $Mg(OH)_2 + 2H_2$ | Room temperature |
| $MgH_2$ | $\Rightarrow$ | $Mg + H_2$ | 200–300° (for ball milled nanocrystalline material) |
| $Mg(OH)_2$ | $\Rightarrow$ | $MgO + H_2O$ | >350° |
| $CaH_2 + 2H_2O$ | $\Rightarrow$ | $Ca(OH)_2 + 2H_2$ | Room temperature |
| $Ca(OH)_2$ | $\Rightarrow$ | $CaO + H_2O$ | 400–580° (self sustain or explosive reaction) |
| $CaH_2$ | $\Rightarrow$ | $Ca + H_2$ | >600° C. |

U.S. Pat. No. 5,202,195 discloses a system for removing the heat generated by a hydrolysis reaction. Such a removal is achieved by convection using a gas circulating through the chemical hydride bed. In the case described above where the heat released during the hydroxide formation is balanced by the heat absorbed by the endothermal desorption, such a cooling system would not be required.

Thus, it is obvious that if $MgH_2$ is used as a chemical hydride, potential applications could be enormous, because of its low cost ranging from small scale portable applications (for example $MgH_2$-chemical hydride/PEM fuel cell tandem for portable cameras) to large scale transportation applications ($MgH_2$-chemical hydride/PEM fuel cell cars).

Another problem which has been discussed by the specialists in this field is the problem of recycling, recovery or regeneration of the end products viz. the hydroxides. Brault et al have proposed a carbothermal process which has to be conducted at temperatures higher than one thousand degrees to convert the LiOH or $Ca(OH)_2$ into reusable Li or Ca.

In the present case where nanocrystalline $MgH_2$ is used as metal hydride, the above mentioned other problem may easily be solved by using dilute HCl instead of pure water as a reactant. Such a <<substitution>> would be conceivable for stationary applications such as in centralized gas refuelling station instead of pure water. Then, the reaction would be:

$$MgH_2 + 2HCl \rightarrow MgCl_2 + 2H_2$$

This reaction has the advantage of being almost instantaneous. Moreover, with such a reaction, the rate of hydrogen evolution can be controlled directly by the concentration of HCl and the by-product ($MgCl_2$, ions in solution) can be <<recycled>> easily. After precipitation, this $MgCl_2$ can be shipped to Mg producers who can use it as such in their electrolysis plant. Indeed, $MgCl_2$ is the material used at the final stage of the production chain to produce industrially Mg by electrolysis.

As aforesaid, the invention lies in the use of a metal hydride that is or has been subjected to intensive mechanical deformations, for the production of hydrogen by chemical reaction. The verb <<has been>> used in the above sentence, means that the metal hydride has already been subjected to ball milling or the like to convert it into a nanocrystalline product before the chemical reaction is carried out. However, in accordance with the invention, such a ball milling could also be made while the chemical reaction is carried out. Indeed, it has been found that one may substantially activate any chemical hydride reaction (hydrolysis being a particular case) when the starting material is subjected to high energy mechanical deformations while the chemical reaction is carried out. Such can be achieved in an apparatus which comprises, on the one hand, a chemical reactor for producing hydrogen from metal hydride and, on the other hand, means such as a ball milling equipment within the reactor for subjecting the reactant to high energy mechanical deformations.

One of the problems of hydrolysis reactions with metal hydrides is that the reactions stall, slow down or stop after a certain time because the hydroxide layer which is formed on the surface of the hydride as a result of the reaction, inhibits further chemical reaction between the hydride in the underlayer and water. By using high energy mechanical deformations generated within, for example, a high energy ball mill chemical reactor in which the particles are fractured to create new fresh hydride surfaces which can react with water, the above problem is circumvented and the reaction can been carried out more rapidly and up to completion.

Figure 3:
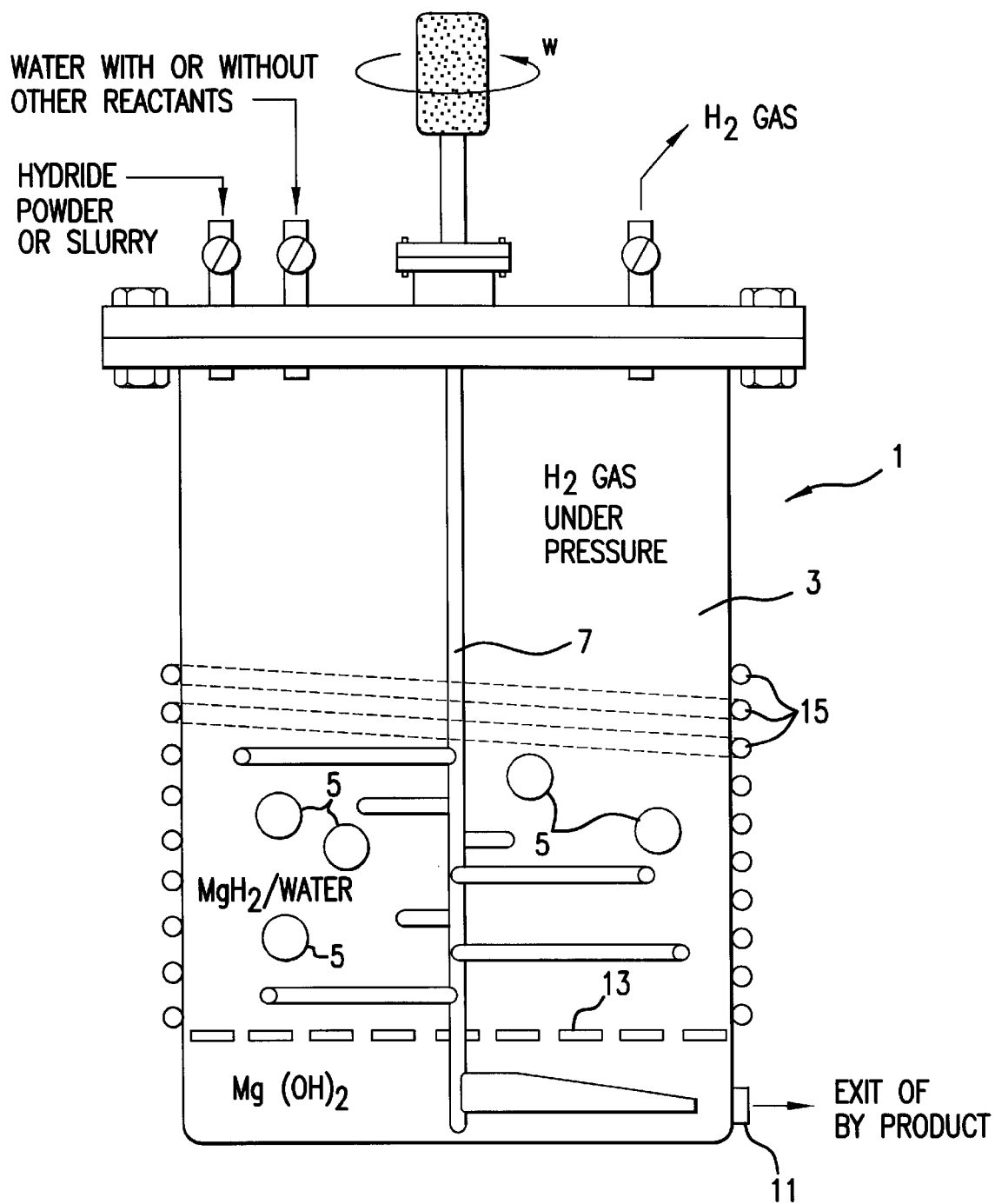
FIG. 3 is a schematic representation in partial cross-section, of an apparatus according to the invention for use to produce hydrogen by chemical reaction of a metal hydride while said hydride is being subjected to intensive mechanical deformations.

FIG. 3 of the accompanying drawings is illustrative of an example of an apparatus 1 according to the invention for carrying out a mechanically activated chemical reaction of a metal hydride. This apparatus 1 comprises a chemical reactor 3 into which water and/or other chemical reactants are injected together with the metal hydride to be reacted in a powder form or in a slurry with organic compounds (mineral oil for instance). Means are provided within the reactor 1 for subjecting the metal hydride to high energy mechanical deformations while it reacts with water and/or the other chemical reactants. These means include steel balls 5 that are agitated with a propeller turning at high speed. Typically mechanical energies are of the order of 0.1 to 5 kW/kg of chemical hydrides or 0.01–0.5 kW/liter, preferably 1–5 kW/kg or 0.1 to 0.5 kW/l.

The by-products ($Mg(OH)_2$ for instance) is more dense than the chemical hydride (2.37 g/cc for $Mg(OH)_2$ versus 1.4 g/cc for $MgH_2$). Therefore, it will segregate at the bottom of the reactor. An exit port 11 for the by-products is located at the bottom. A steel grid 13 can be placed near the bottom of the reactor in order to exclude the balls from the region where the by-products are expelled from the reactor. A heat exchanger 15 can be placed around the reactor to control the temperature of the apparatus.

It has already been proposed to use stirring mechanism of chemical hydrides in reactors, but so far for different purposes. For instance U.S. Pat. No. 5,372,617 discloses the use of a stirring mechanism located in a vessel to prevent clumping of the hydride, to distribute the water to unreacted hydride and to disperse the heat of the reaction throughout the hydride mass and thus to the heat transfer apparatus. This stirring mechanism is obviously different from the one of the present invention. Indeed, it generates only a low energy stirring without using steel balls contrary to the invention. Such, mechanism does not cause fracture of the hydride particles to expose new unreacted surfaces to the water.

The following examples 1 and 2 disclose tests that were carried out by the inventors to show that nanocrystalline chemical hydrides have much better properties than conventional chemical hydride for the production of hydrogen by hydrolysis reaction.

EXAMPLE 1

To emphasize the advantage of the improved method according to the invention, a plurality of tests were carried out using different types of polycrystalline and nanocrystalline magnesium hydrides to produce hydrogen by hydrolysis reaction. The results of these tests are reported in FIGS. 1a, 1b, 1c and 1d, which are curves giving the normalized quantity of hydrogen released during the hydrolysis reaction.

As can be seen, $MgH_2$ in its conventional polycrystalline form reacts very slowly with water. It takes about 4 h to release 13% of its hydrogen storage capacity. X-ray scans made by the Applicant have shown that the dry product obtained after reaction of polycrystalline $MgH_2$ with pure water was actually $Mg(OH)_2$ (brucite), as it could be expected (see the detailed description of the invention hereinabove).

$MgH_2$ in a nanocrystalline form after milling for 20 hours reacts much more rapidly. After 4 h, almost 40% of the stored hydrogen has been released.

Nanocrystalline $MgH_2$ 5 at % V, viz. $MgH_2$ in its nanocrystalline form containing 5% at of vanadium catalyst is faster initially but after sometimes behaves like the nanocrystalline $MgH_2$.

$MgH_2$—5 at % Li ball-milled for only one hour is very fast initially because of the Li. However, the rate of release of hydrogen slows down afterwards and becomes smaller than that of the nanocrystalline $MgH_2$ which has been milled for longer times (20 h).

$MgH_2$—5 at % Ca (FIG. 1b) ball-milled for only one hour releases hydrogen more easily than all of the others.

Figure 1C:
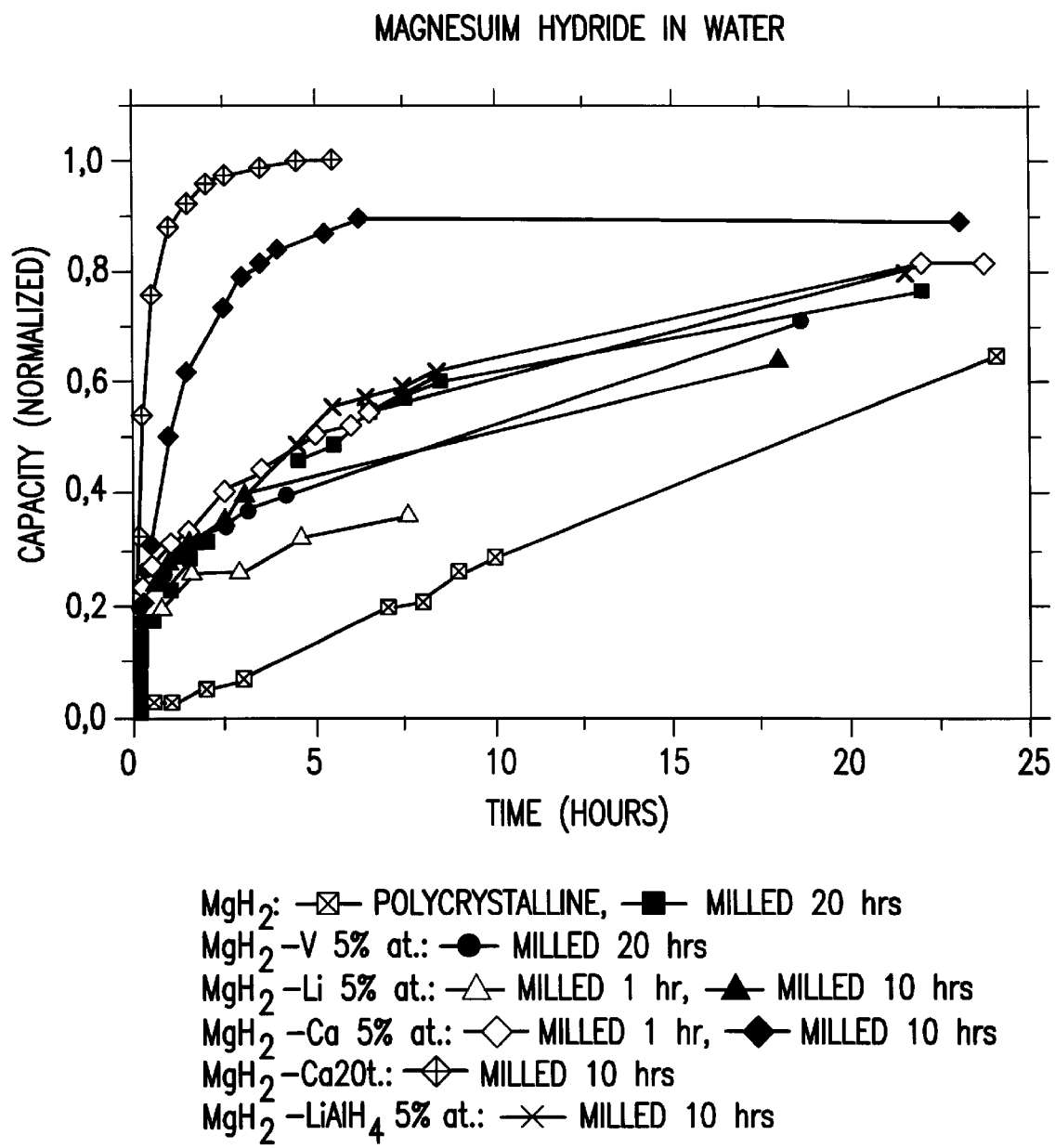

FIG. 1c shows that MgH2 ball-milled with 5% $LiAlH_4$ for 10 hrs has a hydrogen evolution curve close to that of $MgH_2$—5 at % Ca milled for 1 hr or $MgH_2$ milled for 20 hrs.

The best results are obtained when $MgH_2$ is milled with Ca for longer times. FIG. 1c shows that $MgH_2$—5 at % Ca milled for 10 hrs release nearly 90% of its hydrogen content in 6 hrs and $MgH_2$—20 at % Ca milled 10 hrs releases all hydrogen in less than 4 hrs. This is a remarkable result.

Figure 1D:
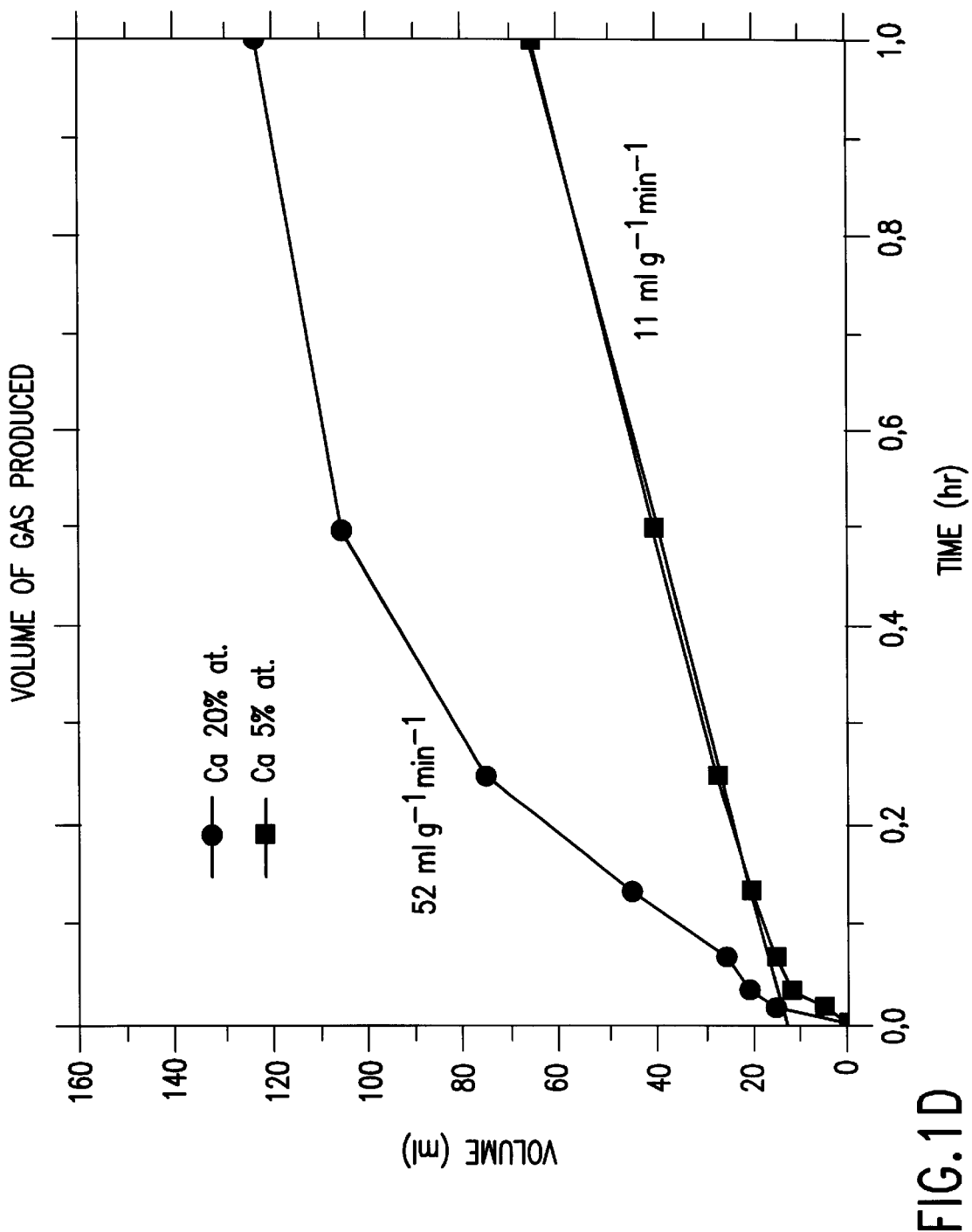
FIG. 1d is a curve giving the volume of hydrogen released by hydrolysis of $MgH_2$—5 at % Ca and $MgH_2$—20 at % Ca milled for 10 hours over 1 hour.
Figure 1E:
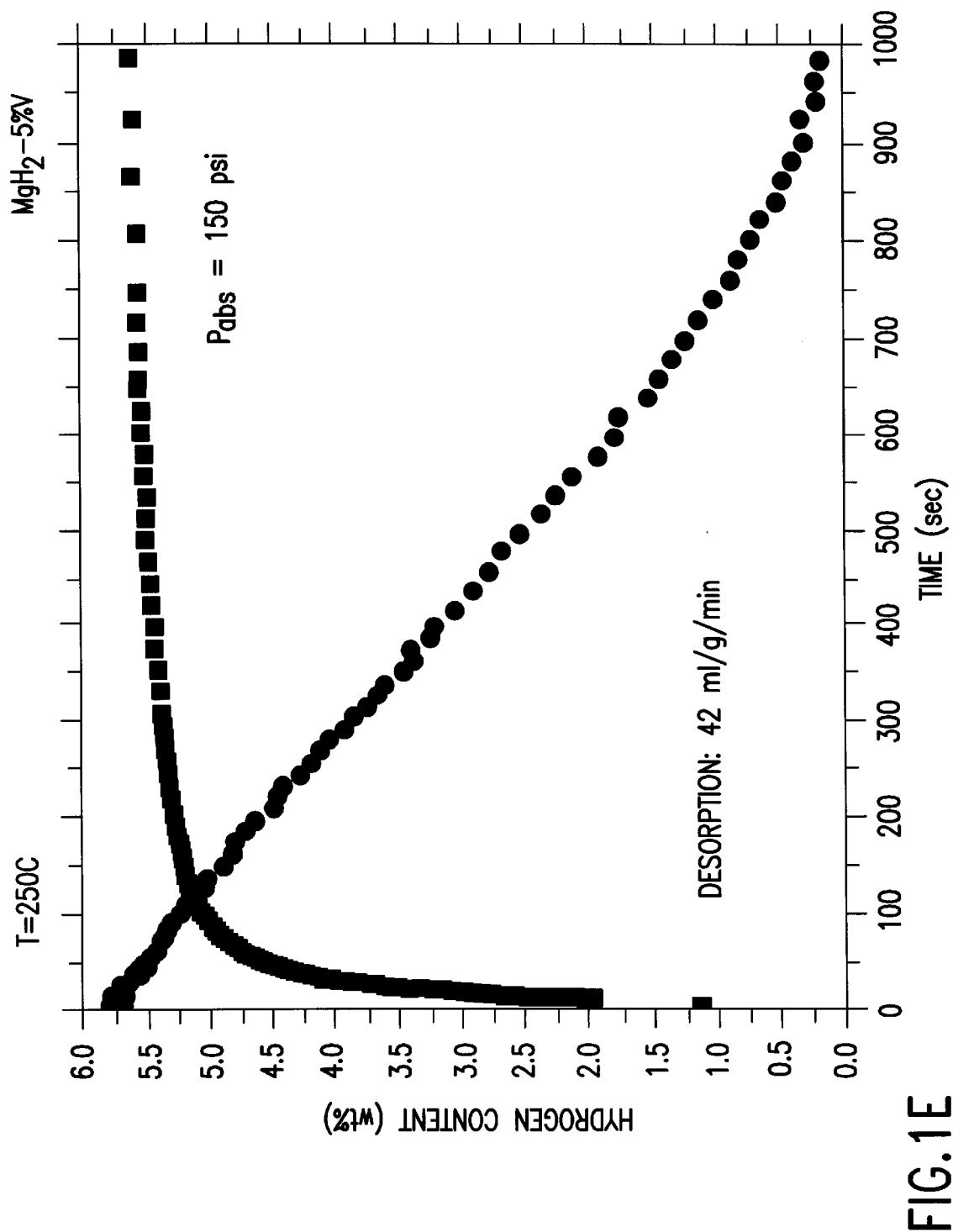
FIG. 1e is a curve giving the hydrogen content expressed in percentage by weight of nanocrystalline $MgH_2$—5 at % V during a desorption carried out at 250° C. under vacuum.

FIG. 1d shows the amount of hydrogen gas liberated during the first hour in the cases $MgH_2$—5 and 20 at % Ca milled of 10 hours. The rate of hydrogen evolution is 11 and 52 ml/g min respectively. The second value is higher than the desorption rate of $MgH_2$—5 at % V at 250° C. under vacuum (42 ml/g min—see FIG. 1e and CA-A-2,217,095). Thus, nanocrystalline $MgH_2$—20 at % Ca has a hydrogen desorption rate that should be sufficient for applications in hydrogen cars.

EXAMPLE 2

Figure 2:
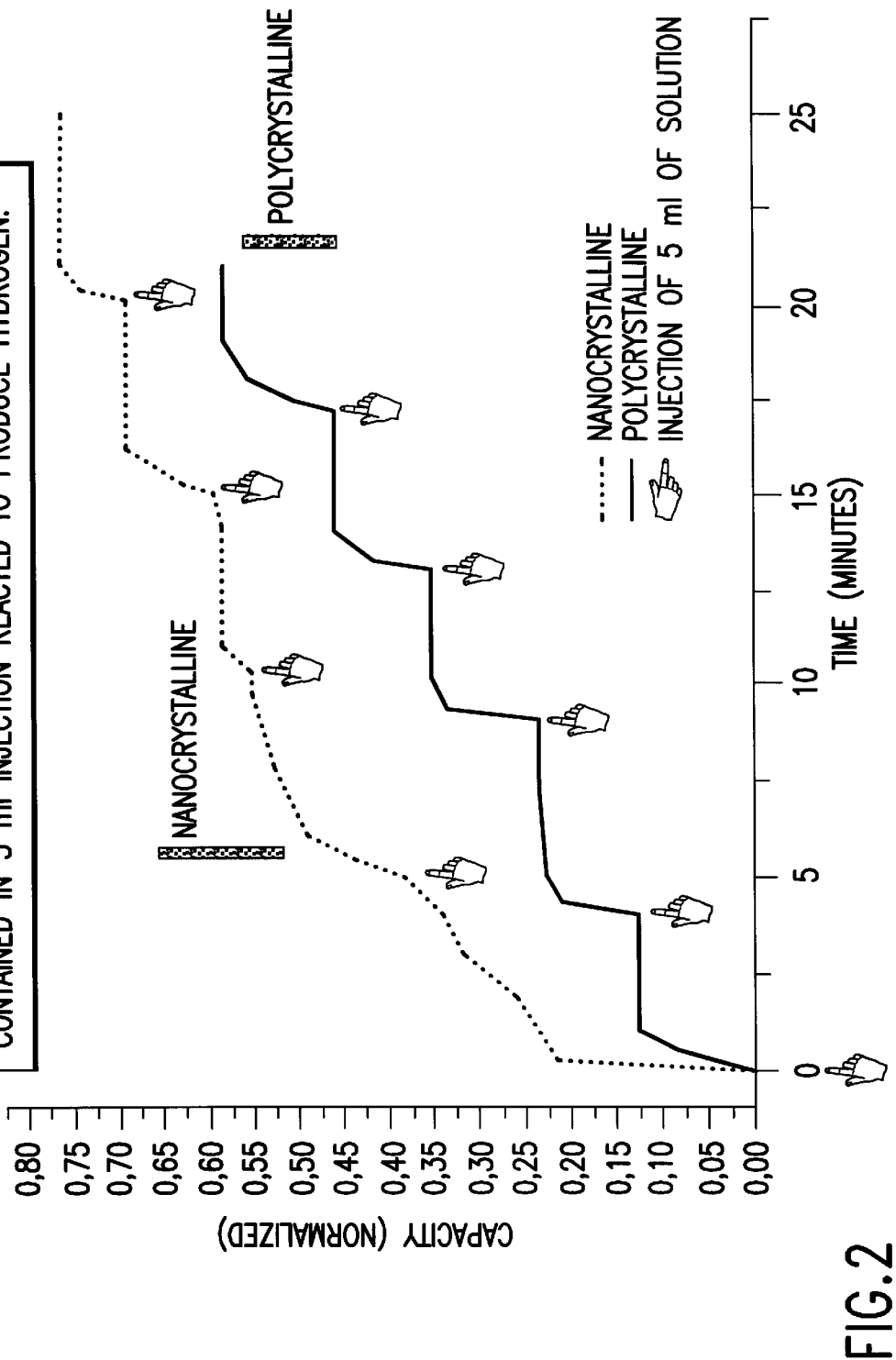
FIG. 2 is a curve giving the normalized quantity of hydrogen released by reaction of polycrystalline and nanocrystalline $MgH_2$ with water containing HCl, as a function of time.

Other tests were carried out using polycrystalline and nanocrystalline magnesium hydrides to produce hydrogen by chemical reaction with water containing 1 part percent of HCl diluted therein. The tests were carried out by injecting batches of 5 ml of acidic solution one after the other in a successive manner into the same reactor. The results of these tests are reported in FIG. 2.

As can be seen, $MgH_2$ in its conventional polycrystalline form reacts rapidly with the chlorine ions to release hydrogen and form $MgCl_2$ after each injection of 5 ml of diluted HCl solution. The height of each step corresponds to the full consumption of Cl ions. The reaction stops when there is no more Cl ions. X-ray scans made by the Applicant have shown that the dry product obtained from the reaction of polycrystalline $MgH_2$ with the HCl dilute solution was actually pure hydrated $MgCl_2$ (Bischofite), as it could be expected (see the detailed description of the invention hereinabove).

In the case of nanocrystalline $MgH_2$, the release of hydrogen is much more important and larger than what is expected from only a reaction with Cl ions. This is indicative that there is also a reaction with water to form hydroxides.

OTHER DATA CONFIRMING THE UTILITY OF THE INVENTION

Equivalent Specific and Volumetric Energy Content of $(MgH_2)_{95}(CaH2)_5$ Nanocomposites Considering the following reaction $$[MgH_2]_{95}[CaH2]_5 + 2H_2O \rightarrow [(Mg(OH)_2]_{95}[Ca(OH)]_{25} + 2H_2;$$

using molecular weights of 27.11 g/mol for $(MgH_2)_{95}$ $(CaH_2)_5$ and 59.11 g/mol for $[Mg(OH)_2]_{95}[Ca(OH)_2]_5$, and a low heating value of hydrogen of 33.3 kWh/kg, and assuming a total volume of 25 cc per mole of $[Mg H_2]_{95}[Ca H_2]_5 + 2H_2O$ the following volumetric and specific energies were calculated:

Volumetric energy: 33.3 Wh/g×4.032 g/mol÷25 cc/mol× 1000 cc/l=5370 Wh/l

Initial specific energy: 33.3 Wh/g×4.032 g/mol÷27.11 g/mol×1000 g/kg=4950 Wh/kg

Final specific energy: 33.3 Wh/g×4.032 g/mol÷59.11 g/mol×2000 g/kg=2270 Wh/kg

Average specific energy: 3610 Wh/kg

These values can be compared with the following volumetric and specific energies of typical reversible batteries:

| | |
|---|---|
| NiCd 150 Wh/l | 50 Wh/kg |
| Ni-MH 270 Wh/l | 70 Wh/kg (the theoretical energy density of the active material is 370 Wh/kg for LaNi$_5$ |
| Li ion 280 Wh/l | 100 Wh/kg |
| USABC goal | 200 Wh/kg |

Such a comparison makes it obvious that, for use as non-rechargeable energy source, the metal hydrides used in the method according to the invention have much higher specific and volumetric energy densities than conventional batteries.

Calculations of the Enthalpy Change of Mg-based Hydrides—Water Reaction and Analysis for a Dual Storage Tank for Car Applications Calculations were made based on the weights, enthalpies and other parameters of different Mg-based hydrides, in order to evaluate the advantages that would result from the use of such hydride in a method to produce hydrogen by chemical reaction as a power source in a car.

The calculations were made assuming that part of $MgH_2$ in a separate tank would be reacted with water vapor and the high heat generated by the reaction would be used to desorb the other part of $MgH_2$ stored (in another tank). The $MgH_2$ in this other tank would actually be a $MgH_2$—V composite and would work as a reversible metal hydride (in this case, the reaction temperature should be at 573° K or above).

Assuming the storage capacity of reversible $MgH_2$—V composite is 6 wt. % and the capacity of $MgH_2$—water reaction is 15.3%, the heat release during the $MgH_2$—water reaction would be balanced by the desorption enthalpy of $MgH_2$—V composite.

Assuming now that one has x kg of reversible $MgH_2$—V, y kg of $MgH_2$ for water reaction on board and 4 kg $H_2$ in order to provide a 500 km run, then the equation would be:

6%*x+15.3%*y=4 kg x=4.65y

Then, one would obtain:

X=43 kg

Y=9.26 kg

As can be seen from the above calculation, one would just consume 9.26 kg $MgH_2$ to produce heat and 1.42 kg $H_2$ and 2.58 kg $H_2$ (extracted from 43 kg of the reversible hydride tank for one run (500 km).

This is demonstrative of the great advantage that could be derived from the use of the present invention.

What is claimed is:

1. In a method for producing gaseous hydrogen by subjecting a metal or a metal hydride to a chemical reaction, the improvement wherein the metal or metal hydride subjected to the chemical reaction is nanocrystalline.

2. The method of claim 1, wherein the chemical reaction is a hydrolysis reaction.

3. The method of claim 1, wherein the nanocrystalline metal hydride is a metal hydride prepared by mechanosynthesis.

4. The method of claim 1, wherein the nanocrystalline metal hydride is a metal hydride prepared by mechanosynthesis of the corresponding metal hydride in polycrystalline form.

5. The method of claim 1, wherein the nanocrystalline metal hydride is a metal hydride prepared by reactive milling.

6. The method of claim 1, wherein the nanocrystalline metal or metal hydride is a metal or metal hydride prepared by gas phase condensation or laser or plasma processing, by sol-gel or by chemical routes or spray techniques.

7. The method of claim 1, wherein the nanocrystalline metal hydride contains at least one element selected from the group consisting of Mg, Li, Be, Ca, Na, K, Al, Ti, V, Cr, Mn, Co, Ni, Cu, Fe, Zn, B, Zr, Y, Nb, Mo, In, Sn, Si, H, C, O, F, P, S, La, Pd, Pt, Mm and Re, where Mm is mish-metal and Re is a rare earth metal.

8. The method of claim 1, wherein the nanocrystalline metal hydride is a Mg based metal hydride.

9. The method of claim 1, wherein the nanocrystalline metal hydride contains Mg, Li and H.

10. The method of claim 1, wherein the nanocrystalline metal hydride contains Mg, Ca and H.

11. The method of claim 1, wherein the nanocrystalline metal hydride is in the form of a pellet.

12. The method of claim 9, where the pellet comprises a binder.

13. The method of claim 10, where the binder is Mg.

14. The method of claim 2, wherein the hydrolysis reaction includes HCl as a reactant.

15. In a method for producing gaseous hydrogen by subjecting a metal or metal hydride to an exothermic chemical reaction, the improvement which consists of subjecting the metal or metal hydride to intense mechanical deformations prior to or during the exothermic chemical reaction, in order to activate said exothermic chemical reaction.

* * * * *